UNITED STATES PATENT OFFICE.

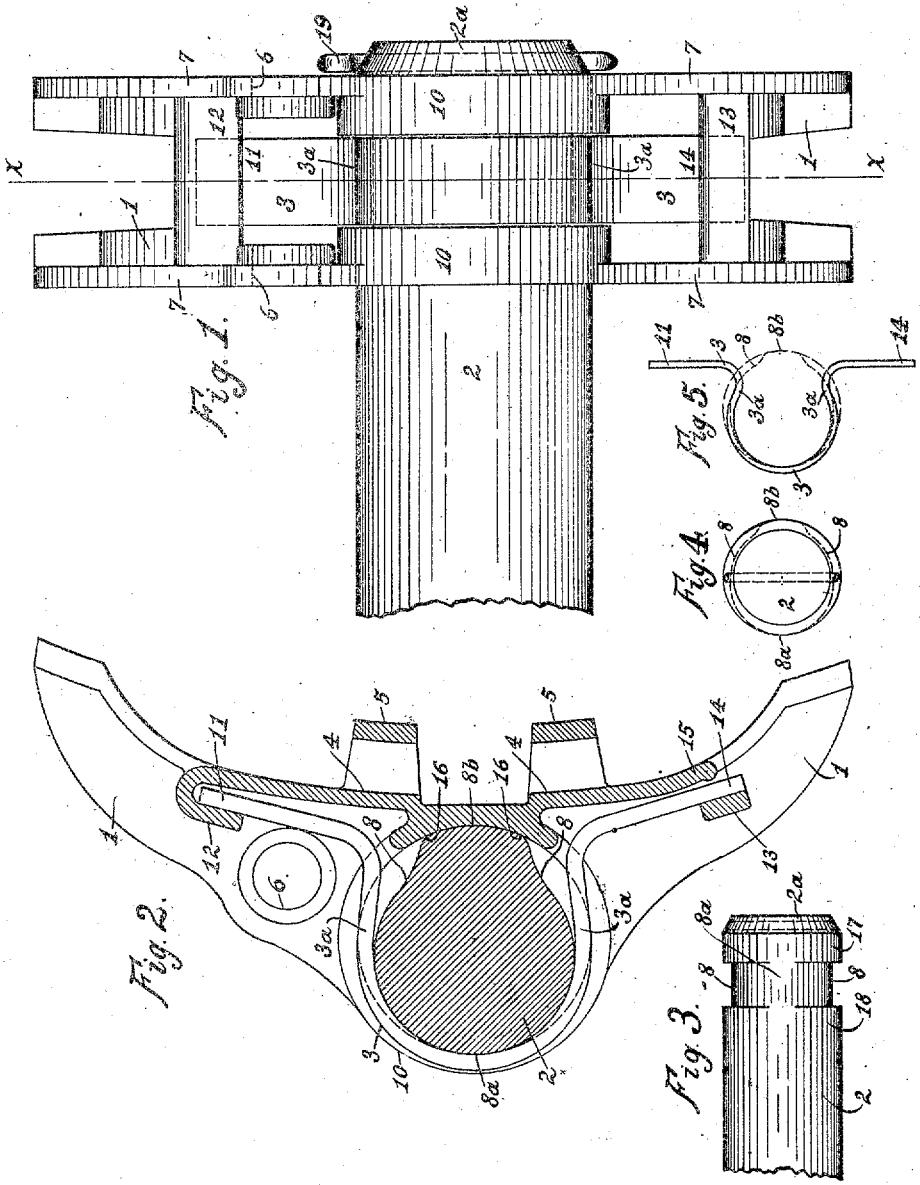

LEMUEL PORTER, OF CHICAGO, ILLINOIS.

ADJUSTABLE BRAKE-HEAD.

957,251.  Specification of Letters Patent.  Patented May 10, 1910.

Application filed October 18, 1909. Serial No. 523,296.

*To all whom it may concern:*

Be it known that I, LEMUEL PORTER, a citizen of the United States of America, residing at Chicago, in the county of Cook and State of Illinois, have invented a new and useful Adjustable Brake-Head, of which the following is a specification, reference being had to the accompanying drawings, illustrating same.

My invention relates to brake apparatus, and particularly to adjustable heads for such apparatus, the principal objects of my invention being to provide an improved brake head of the character herein set forth, and to provide simplicity, efficiency and durability in such a brake head.

Other objects will be apparent from the following specification.

In the accompanying drawings, illustrating the preferred form of my invention, Figure 1 is a side elevation of the preferred form of my improved brake head; Fig. 2 is a cross-sectional view of the brake head shown in Fig. 1, taken on plane $x$ $x$ of Fig. 1, with the holding spring shown in elevation; Fig. 3 is a side elevation of one end of the brake beam used in connection with the brake head of Figs. 1 and 2; Fig. 4 is an end view of the brake beam shown in Fig. 3; and Fig. 5 is an edge elevation of the leaf spring used for holding the brake head in position on the brake beam, the brake beam being shown in dotted lines to show the relative normal position of the spring when not in use.

Like characters refer to like parts in the several figures.

In the drawings, 1 is the brake head, which is preferably formed as shown; 2 is the preferred form of brake beam used with the head 1; and 3 is a leaf spring holding the head 1 to the beam 2 preferably as shown. The beam 2 may be either solid or hollow, or of various shapes.

In the following specification I will describe only one end of the brake beam and one brake head, it being understood that the other end of the brake beam may be equipped with another similar brake head if desired.

It will be readily understood that a brake shoe may be attached to the face of the brake head 1 in any suitable manner, preferably by a pin driven through the openings 4 4 in the lugs 5 5 of the brake head 1. The brake beam and head may be suspended from the openings 6 6 in the side flanges 7 7 of the head 1, in a manner well understood.

Near the end of the brake beam 2 are formed eccentric recesses 8 8 therein preferably as shown, in which recesses the curved portions $3^a$ $3^a$ of the leaf spring 3 rest when the head 1 is secured to the beam 2. In securing the head 1 to the beam 2, the spring 3 is first inserted in place relatively to the head 1, by one end 14 thereof being inserted through the opening between the lug 13 and the portion 15 of the head 1, and the other end 11 thereof being hooked under the lip 12 of the head 1. Then the beam 2 is inserted through the openings in the hubs 10 10 of the head 1, preferably in a position ninety degrees around from the position shown in Fig. 2, the head 1 being then turned to the position shown in Fig. 2 so that the curved portions $3^a$ $3^a$ of the spring 3 rest in the recesses 8 8 in the beam 2 as shown in Fig. 2. The end of the beam 2 is preferably tapered as shown at $2^a$, so that it may be readily inserted through the hubs 10 10 and the curved portion $3^a$ $3^a$ of the spring 3. The eccentric recesses 8 8 come flush with the outer surface of the beam 2 at $8^a$ and $8^b$, preferably as shown in the drawings, so that these portions $8^a$ and $8^b$ will force the curved portions $3^a$ $3^a$ of the spring 3 apart when the beam is being inserted through the head 1 and spring 3 in a position ninety degrees around from the position shown in Fig. 2. Of course when the head 1 is now turned on the beam 2 to the position shown in Fig. 2, the portions $3^a$ $3^a$ of the spring 3 spring down into the eccentric recesses 8 8 as shown in Fig. 2. Through the tapered portion $2^a$ of the beam 2 is preferably placed a cotter pin 19 adapted to keep the head 1 from coming off of the beam 2 in case the spring 3 should break.

In case it is desired to remove the brake head 1 from the brake beam 2, it only necessary to remove the cotter pin 19 and then turn the head 1 on the beam 2 ninety degrees around from the position shown in Fig. 2, so that the portions $8^a$ and $8^b$ spread the portions $3^a$ $3^a$ of the spring 3 apart, and then pull the head 1 from the beam 2.

The curved portion $3^a$ $3^a$ of the spring 3 is normally of smaller curvature than the recesses 8 8 of the beam 2, as shown in Fig. 5, so that the spring of its own accord will clamp around the beam 2 in the recesses 8 8. When the ends 11 and 14 of the spring 3 are bent downwardly and hooked under the portions 12 and 13, respectively, of the head 1, as shown in Fig. 2, the gripping action of the spring 3 on the beam 2 is greatly increased. This construction enables the whole length of the spring 3 to be utilized to clamp the head 1 to the beam 2. The spring 3 is formed so as to snugly fit the beam 2 for a little more than half-way therearound, when the head 1 is secured to the beam 2 as shown in Fig. 2. The tension of the spring 3 bears the beam 2 snugly against the curved portion 16 of the head 1, in the meantime the ends 11 and 14 of the spring 3 bearing against the portions 12 and 13, respectively, of the head 1. The portion 8$^b$ of the beam 2 also serves to increase the bearing surface between the beam 2 and the portion 16 of the head 1, which is of great advantage in certain instances.

The hubs 10 10 of the head 1 are constructed to closely fit the cylindrical portions 17 and 18, respectively, of the beam 2, so as to not give much play between these parts.

When the brake is applied to a wheel, in any suitable well-known manner, the head 1 and spring 3 will adjust themselves on the beam 2, by moving slightly therearound if necessary, so that the brake shoe properly fits the curvature of the wheel. This adjustment of the head 1 on the beam 2 is permitted by the curved portion 3$^a$ 3$^a$ of the spring 3, and the hubs 10 10 and the curved portion 16 of the head 1, sliding slightly around the beam 2. Thus it will be seen that the head 1, with its brake shoe, is capable of any desired adjustment around the beam 2. The tension of the spring 3 against the beam 2 is sufficient to hold the head 1 in any position on the beam 2 after being once adjusted to such position.

I wish it to be understood that if greater tension is required in the spring 3, I may use two or more leaf springs, one on top of the other, formed somewhat like the spring shown in the drawings.

The advantages of the construction above described are many. For instance the device of this invention does away with the old-time pawl, thus eliminating the objectionable features of the pawl and at the same time simplifying the apparatus. One objection to a pawl is that it sometimes digs a hole into the journal and eventually locks the brake head against adjustment. The device of this invention cannot do this. With the form of leaf spring shown in the drawings of this specification, the ends of the spring can in no way dig into the brake head and thereby tend to lock the head against adjustment after considerable usage. With the spring of this invention the vibration of the brake head, due to the jumping of the brake shoe on the wheel, produces a minimum vibration of the leaf spring, thus greatly increasing the life of the spring. With the device of this invention a minimum space can be provided between the face of the brake shoe and the brake beam. This is advantageous in certain instances.

I do not wish to limit this invention to all of the various details herein set forth, as various modifications thereof may be made without departing from the scope of the appended claims.

What I claim as my invention is:

1. A device of the character described comprising a brake head, a brake beam carrying the head, and a leaf spring sprung around the said beam and having its ends turned outwardly and detained by portions of the head, whereby the head is held in place on the beam and is capable of automatic adjustment therearound, substantially as set forth.

2. A device of the character described comprising a brake head, a brake beam carrying the head, and a leaf spring sprung over the beam and gripping the latter, the said spring having its ends detained by the head, whereby the latter is held in place on the beam and is capable of adjustment thereon, substantially as set forth.

3. A device of the character described comprising a brake head, a brake beam carrying the head and having a transverse recess therein, and a leaf spring sprung around the said beam in the said recess and having its ends turned outwardly and detained by the head, whereby the head is held in place on the beam and is capable of automatic adjustment therearound, substantially as set forth.

4. A device of the character described comprising a brake head, a brake beam carrying the head and having transverse recesses therein, and a leaf spring sprung around the said beam in the said recesses and having its ends turned outwardly and detained by the head, whereby the head is held in place on the beam and is capable of automatic adjustment therearound, substantially as set forth.

5. A device of the character described comprising a brake head, a brake beam carrying the head and having transverse recesses in opposite sides thereof, and a leaf spring sprung around the said beam in the said recesses and having its ends detained by the head, whereby the head is held in place on the beam and is capable of automatic adjustment therearound, the said recesses coming flush with the outer surface of the beam on opposite sides thereof whereby when the brake head is turned one-fourth of a revolution on the brake beam the latter spreads the said spring apart to permit the said head to be removed from the beam.

6. A device of the character described comprising a brake head, a brake beam carrying the head and having transverse eccentric recesses in opposite sides thereof, and a leaf spring sprung around the said beam in the said recesses and having its ends detained by the head, whereby the head is held in place on the beam and is capable of automatic adjustment therearound, the said recesses coming flush with the outer surface of the beam on opposite sides thereof whereby when the brake head is turned one-fourth of a revolution on the brake beam the latter spreads the said spring apart to permit the said head to be removed from the beam.

7. A device of the character described comprising a brake head, a brake beam having a tapered end whereby it may be readily inserted through the head, and transverse recesses in opposite sides thereof, and a curved leaf spring adapted to be placed over the beam and having its ends detained by the head, the said recesses coming flush with the outer surface of the beam on opposite sides thereof whereby the said spring is held apart when the brake head is being placed on the said beam, or removed therefrom, turning the said head part way around on the beam from the aforesaid position causing the said spring to spring down into the said recesses for purposes substantially as described.

8. A device of the character described comprising a brake head, a brake beam carrying the head, and a curved leaf spring sprung around the beam and gripping the latter, the said spring having its ends detained by the head, for purposes substantially as described.

9. A device of the character described comprising a brake head, a brake beam carrying the said head and having a transverse recess therein, and a curved leaf spring sprung around the said beam in the said recess and having its ends detained by the said head, for purposes substantially as described.

10. A device of the character described comprising a brake head, a brake beam carrying the said head and having transverse recesses therein, and a curved leaf spring sprung around the said beam in the said recesses and having its ends detained by the said head, for purposes substantially as described.

11. A device of the character described comprising a brake head, a brake beam carrying the said head and having transverse eccentric recesses therein, and a curved leaf spring sprung around the said beam in the said recesses and having its ends detained by the said head, for purposes substantially as described.

12. A device of the character described comprising a brake head, a brake beam carrying the said head, and a leaf spring normally having a smaller curvature than the beam so as to grasp the beam of its own accord when placed therearound, and portions on the said head adapted to detain the ends of the said spring under tension when the apparatus is assembled, whereby the grasping force of the said spring on the beam is increased, for purposes substantially as described.

13. A device of the character described comprising a brake head, a brake beam carrying the said head and having a transverse recess therein, and a leaf spring normally having a smaller curvature than the said recess so as to grasp the beam in the said recess of its own accord when placed therearound, and portions on the said head adapted to detain the ends of the said spring under tension when the apparatus is assembled, whereby the grasping force of the said spring on the beam is increased, for purposes substantially as described.

14. A device of the character described comprising a brake head, a brake beam carrying the said head and having transverse recesses therein, and a leaf spring normally having a smaller curvature than the said recesses so as to grasp the beam in the said recesses of its own accord when placed therearound, and portions on the said head adapted to detain the ends of the said spring under tension when the apparatus is assembled, whereby the grasping force of the said spring on the beam is increased, for purposes substantially as described.

15. A device of the character described comprising a brake head, a brake beam carrying the said head and having transverse eccentric recesses therein, and a leaf spring normally having a smaller curvature than the said recesses so as to grasp the beam in the said recesses of its own accord when placed therearound, and portions on the said head adapted to detain the ends of the said spring under tension when the apparatus is assembled, whereby the grasping force of the said spring on the beam is increased, for purposes substantially as described.

16. A device of the character described comprising a brake head having an opening therethrough, a brake beam extending through the opening in the said head and having transverse recesses therein, and a leaf spring sprung over the beam in the said recesses and having its ends detained by the said head, the said recesses coming flush with the outer surface of the beam on at least one side thereof whereby the bearing surface between the beam and the head is increased, substantially as set forth.

17. A device of the character set forth comprising a brake head, a brake beam carrying the head, and a spring member sprung over the beam and gripping the latter, the said spring member having its end portions detained by the head, substantially as set forth.

18. A device of the character set forth comprising a brake head, a brake beam carrying the head, and a spring member sprung over the beam and gripping the latter, the said spring member being detained by the head, substantially as set forth.

19. A device of the character set forth comprising a brake head, a brake beam carrying the head, and a spring member sprung over the beam and having its ends turned outwardly and detained by the head, substantially as set forth.

20. A device of the character set forth comprising a brake head, a brake beam carrying the head, and a spring member sprung over the beam and engaging the latter for approximately 180 degrees therearound, the said spring member having its end portions detained by the head, substantially as set forth.

21. A device of the character set forth comprising a brake head, a brake beam carrying the head, and a spring member sprung over the beam and engaging the latter for approximately 180 degrees therearound, the said spring member being detained by the head, substantially as set forth.

As inventor of the foregoing I hereunto subscribe my name, this 14th day of October, 1909.

LEMUEL PORTER.

Witnesses:
FREDERICK R. PARKER,
MICHAEL J. STARK.